United States Patent
Johnston et al.

(10) Patent No.: US 9,470,794 B1
(45) Date of Patent: Oct. 18, 2016

(54) AIRCRAFT COLLISION WARNING SYSTEM

(71) Applicant: JETPROTECT CORPORATION, Santa Clara, CA (US)

(72) Inventors: Gregory Johnston, San Jose, CA (US); James Bowlby, San Jose, CA (US)

(73) Assignee: JETprotect Corporation, Santa Clara, CA (US)

( * ) Notice: Subject to any disclaimer, the term of this patent is extended or adjusted under 35 U.S.C. 154(b) by 9 days.

(21) Appl. No.: 14/078,400

(22) Filed: Nov. 12, 2013

Related U.S. Application Data (62) Division of application No. 12/284,746, filed on Sep. 24, 2008, now Pat. No. 8,587,770.

(51) Int. Cl.
*G01C 3/08* (2006.01)
*G01S 17/93* (2006.01)
*G01S 13/93* (2006.01)

(52) U.S. Cl.
CPC .......... *G01S 17/933* (2013.01); *G01S 13/9303* (2013.01)

(58) Field of Classification Search
CPC ............. G01S 7/02; G01S 7/48; G01S 13/00
USPC ............. 356/3.01–3.15, 4.01–4.1, 6–22, 28, 356/28.5
See application file for complete search history.

(56) References Cited

U.S. PATENT DOCUMENTS

| | | | |
|---|---|---|---|
| 6,198,528 B1 * | 3/2001 | Maynard | 356/141.1 |
| 6,665,063 B2 * | 12/2003 | Jamieson et al. | 356/141.1 |
| 7,282,695 B2 * | 10/2007 | Weber et al. | 250/225 |

* cited by examiner

*Primary Examiner* — Luke Ratcliffe
(74) *Attorney, Agent, or Firm* — Haverstock & Owens LLP (57) ABSTRACT

An aircraft collision warning system includes an optical detection system has a toroidal and conical field of view about the aircraft to detect near objects. The detection system utilizes thermal detection in a passive mode. Optionally, the detection system also includes radio frequency (RF) elements to form a directional radar for improved object detection confidence. The radar is used in either a passive or active mode. The detection system includes a detector array to detect light from the toroidal-shaped and conical-shaped airspace. Data from the detector array is accumulated and analyzed for objects. Upon object detection, the object is tracked, kinetically assessed for collision with the aircraft, and reported to the pilot and/or auto-pilot system. The detection system is configured as a non-cooperative system that stares into the toroidal and conical field of view.

23 Claims, 10 Drawing Sheets

AIRCRAFT COLLISION WARNING SYSTEM

This Patent Application is a divisional of co-pending U.S. patent application Ser. No. 12/284,746, filed on Sep. 24, 2008, and entitled "AIRCRAFT COLLISION WARNING SYSTEM." The U.S. patent application Ser. No. 12/284,746, filed on Sep. 24, 2008, and entitled "AIRCRAFT COLLISION WARNING SYSTEM" is hereby incorporated in its entirety by reference.

FIELD OF THE INVENTION

The invention relates to a method and apparatus for detecting the presence of objects in a defined space. In particular, the invention relates to a method and apparatus for detecting near objects and relative positions.

BACKGROUND OF THE INVENTION

Conventional aircraft collision avoidance systems are cooperative in nature. Each aircraft includes a transponder that transmits a detectable signal providing identification and positioning information to other aircraft and ground based systems. Aircraft and ground based systems receive this transmitted data for all aircraft in a defined area and generate a three-dimensional map indicating the aircraft positions.

Most aircraft also include a radar system. Radar is a system that uses electromagnetic waves to identify the range, altitude, direction, or speed of both moving and fixed objects such as aircraft, ships, motor vehicles, weather formations, and terrain. A radar system has a transmitter that emits either radio waves or microwaves that are reflected by the target and detected by a receiver, typically in the same location as the transmitter. Although the signal returned is usually very weak, the signal can be amplified. This enables radar to detect objects at ranges where other emissions, such as sound or visible light, would be too weak to detect. Radar is used in addition to monitoring transponder signals. Radar is effective in all weather conditions, but requires significant effort to focus. As such, radar is useful for determining range and bearing, but is not particularly useful for determining precise size and definition.

SUMMARY OF THE INVENTION

Embodiments of the present invention are directed to an apparatus for and a method of protecting an aircraft from collisions. A detection system has a toroidal field of view about the aircraft to detect near objects. In some embodiments, the detection system also has a conical field of view below the aircraft. In some embodiments, the detection system utilizes thermal detection. Optionally, the detection system also includes radio frequency (RF) elements to form a directional radar for improved object detection confidence. The RF elements are positioned on an outside surface of a detection system housing. The detection system includes a detector array to detect light from the toroidal-shaped and conical-shaped airspace. Data from the detector array is accumulated and analyzed for objects. Upon objet detection, the objects are tracked, kinetically assessed for collision with the aircraft, and reported to the pilot and/or auto-pilot system.

The detection system is configured as a non-cooperative system that stares into a toroidal and conical field of view about the aircraft. As used herein, a "non-cooperative" object refers to an object that does not purposely transmit its position, as in a transponder. As also used herein, "staring" refers to using stationary optics. Staring does not include optical components that move, pan, tilt, or rotate to scan across a field a view. In some embodiments, the detection system is passive, where the detection system detects near-object thermal energy and spurious EM (electro-magnetic) energy coming at the aircraft. In other embodiments, the detection system is configured for active detection. In this case, the detection system includes radar for transmitting outbound signals and monitoring for resulting reflected inbound signals.

The detection system of collecting thermal energy is comprised of a set of novel shaped mirrors that collect light for the detector array and overcomes the obstruction of a housing that mechanically supports the mirror segments to an aircraft fuselage.

The detection system is located on the under belly of the aircraft to view a defined space below and slightly above to detect near-objects. A second detection system can be added to the top surface of the aircraft to give a complete sphere of detection to the airplane. The housing includes a novel cowling shape at the base of the support structure that guides the high speed airflow around the mirror segments to maintain a uniform temperature over the mirror segments. By maintaining an even air flow, the mirror does not contribute thermal noise as part of the optical collection system.

The optional RF antenna elements are individually measured with respect to their received radiation intensity and phase to each other to achieve a directional measurement of external EM that is likely generated from a nearby aircraft.

These and other advantages will become apparent to those of ordinary skill in the art after having read the following detailed description of the embodiments which are illustrated in the various drawings and figures.

BRIEF DESCRIPTION OF THE DRAWINGS

The accompanying drawings, which are incorporated in and form a part of this specification, illustrate embodiments of the invention and, together with the description, serve to explain the principles of the invention but not limit the invention to the disclosed examples.

DETAILED DESCRIPTION OF THE PRESENT INVENTION

The present invention is described relative to the several views of the drawings. Where appropriate and only where identical elements are disclosed and shown in more than one drawing, the same reference numeral will be used to represent such identical elements.

Reference will now be made in detail to the embodiments of the object detection and collision avoidance system of the invention, examples of which are illustrated in the accompanying drawings. While the invention will be described in conjunction with the embodiments below, it will be understood that they are not intended to limit the invention to these embodiments and examples. On the contrary, the invention is intended to cover alternatives, modifications and equivalents, which may be included within the spirit and scope of the invention as defined by the appended claims. Furthermore, in the following detailed description of the present invention, numerous specific details are set forth in order to more fully illustrate the present invention. However, it will be apparent to one of ordinary skill in the prior art that the present invention may be practiced without these specific details. In other instances, well-known methods and procedures, components and processes have not been described in detail so as not to unnecessarily obscure aspects of the present invention.

Some portions of the detailed descriptions which follow are presented in terms of procedures, logic blocks, processing, and other symbolic representations of operations on data bits within a computer system and memory or over a communications network. These descriptions and representations are intended to most effectively describe to those skilled in the data processing arts to convey the substance of the invention. A procedure, logic block, or process is here, and generally, conceived to be a self-consistent sequence of steps or instructions leading to a desired result. The term computing system is used herein as a digital arithmetic integrated circuit comprised of memory, a central processing unit and interface logic. The operation is from algorithms and rules stored in non-volatile memory to measure the sensors, compute a result and take an action. This is often referred to as an embedded system. Although reference to a computing system is used, it is understood that application of the described methods can be similarly applied using any similar electronic device.

Figure 1:
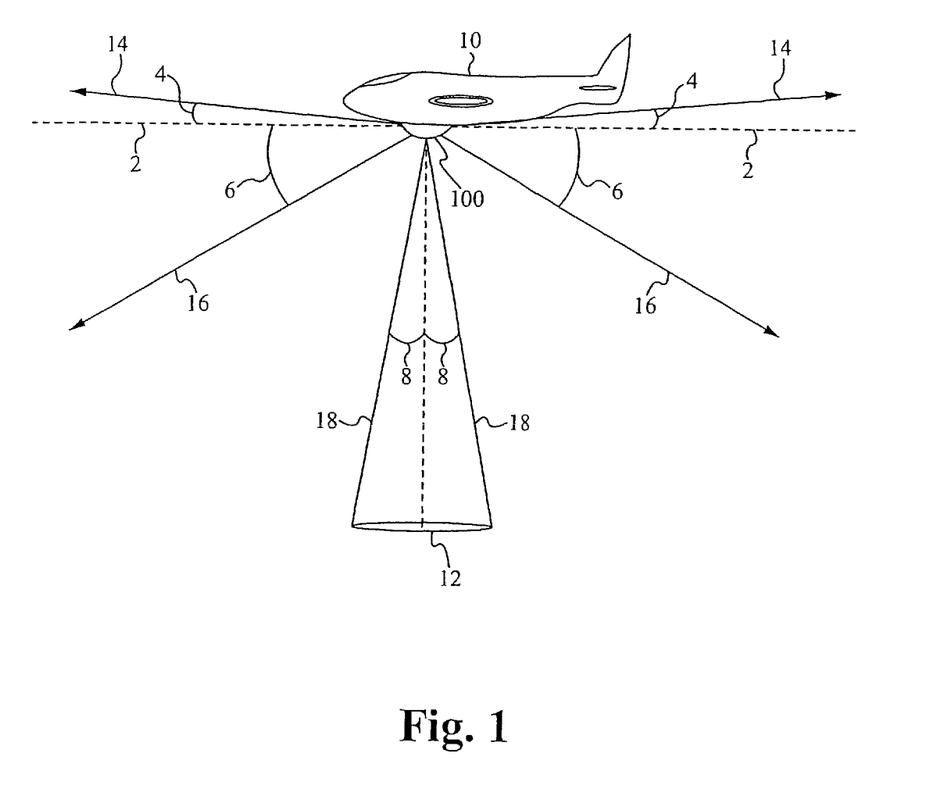
FIG. 1 illustrates an elevation view of an aircraft 10 and an exemplary field of view covered by a detection system 100 of the present invention.

FIG. 1 illustrates an elevation view of an aircraft 10 and an exemplary field of view covered by a detection system 100 of the present invention. The detection system 100 is coupled to an underside of aircraft 10. Light enters an active panoramic area of the detection system 100 through an angel 360° in azimuth and a first angle 4 above the horizon 2 and a second angle 6 depressed below the horizon 2. The resulting toroidal field of view, or toroidal-shaped airspace, is defined by an upper boundary 14, as defined by the first angle 4, and a lower boundary 16, as defined by the second angle 6. An outer bound of the toroidal-shaped airspace is defined by an optical assembly included within the detection system 100. In some embodiments, the first angle 4 is 5° and the second angle 6 is 30°. Alternatively, the first angle 4 and the second angle 6 are any angles configured according to a mirror segment assembly within the detection system 100. The mirror segment assembly is shaped in such a way as to map the airspace into a detector array preserving equal, or otherwise predetermined, pixel resolution for each angle of elevation, or declination, within a toroidal-shaped airspace.

The active panoramic area of the detection system 100 also includes a conical field of view below the aircraft. This conical-shaped airspace is defined by conical boundary 18, which is defined by cone angle 8 about horizon normal 12. In some embodiments, the cone angle 8 is 12°. Alternatively, the cone angle is any angle configured according to the mirror segment assembly within the detection system 100.

Within the toroidal and conical field of views shown in FIG. 1, there is not 100% coverage around the aircraft at any given moment. However, due to the dynamics of a moving aircraft, some of the airspace not covered by the toroidal and conical field of view at one instant is covered in a next instant by the movement of the aircraft. In this case, the delay is related to the speed and attitude (pitch, roll, yaw rates) of the aircraft in combination with the dynamics of any detected object.

Figure 2:
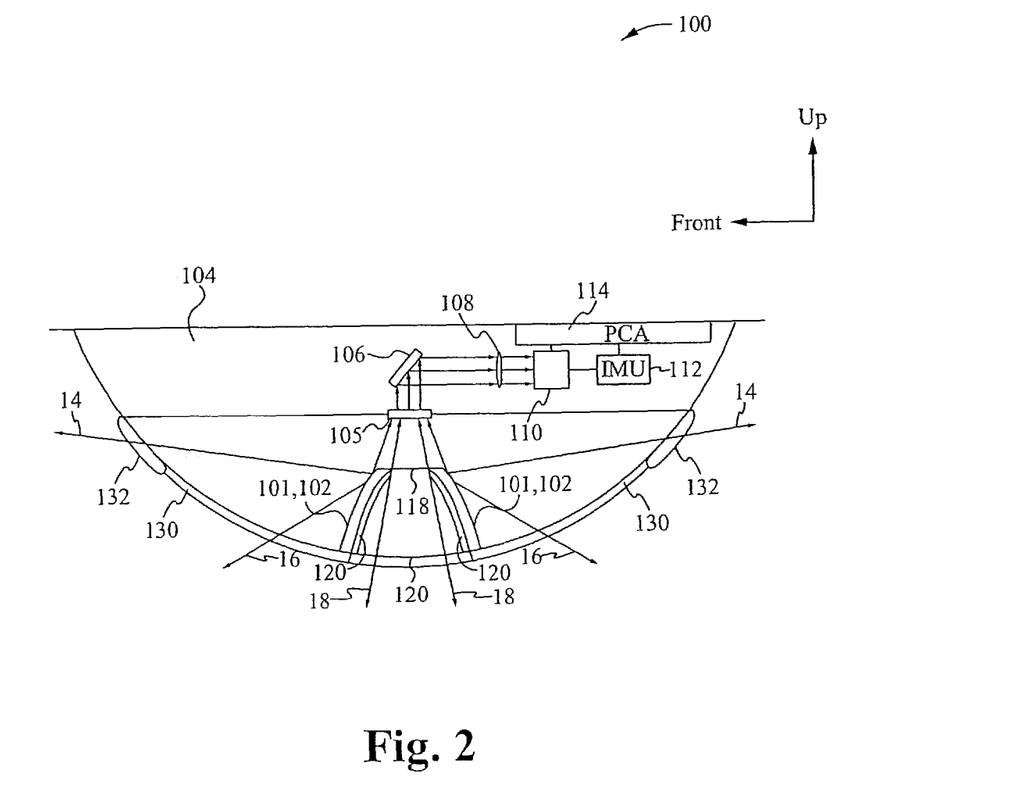
FIG. 2 illustrates a cut-out side view of an exemplary configuration of the detection system 100.

FIG. 2 illustrates a cut-out side view of an exemplary configuration of the detection system 100. The detection system 100 includes a mirror segment assembly and a housing 104. The mirror segment assembly includes multiple mirror segments, struts 130, and a fairing 120. In the exemplary configuration shown in the following figures and described below, the mirror segment assembly includes two mirror segments 101 and 102. The struts 130 are coupled to the housing 104 and to the fairing 120. The detection system 100 is coupled to the aircraft 10 by the struts 130. The fairing 120 supports the mirror segments 101, 102, and holds the mirror segments 101, 102 in place relative to the aircraft 10. The struts 130 include a circular airfoil 132 (also see FIG. 7) at the base of the struts 130 to deflect the airflow out of the path of the mirrors segments 101, 102, thereby maintaining a stable flow field that reduces temperature fluctuations at the surface of each mirror segment 101, and keeping each mirror segment 101, 102 clean.

Light reflecting from the mirror segments 101, 102 enters the housing 104 through a bezel and lens 105, reflects off a stationary mirror 106, into a lens 108, and impinges onto a detector array 110, where signal electronics also reside. In some embodiments, the bezel 105 is configured as a flat Germanium bezel. Optionally, included in the housing 104 is an inertial measurement unit (IMU) 112 and a system processing assembly 114. The system processing assembly 114 includes a system processor and other related electronics, as described in greater detail below. In some embodiments, the area within the housing 104 is sealed such that a desired environment can be created. In one exemplary application, a nitrogen environment is created within the housing 104.

The mirror segments 101, 102 are configured such that light from within the toroidal-shaped airspace, as defined by the boundaries 14 and 16, is reflected through the bezel 105. Each mirror segment 101, 102 can also be configured such that when assembled an opening 118 is formed at an apex of the mirror segments 101, 102, which is located closest to the bezel 105. The opening 118 enables light to enter the bezel 105 from the conical-shaped airspace below the aircraft 10, as defined by the conical boundary 18. To enable light to pass up through the opening 118, the fairing 120 can be configured in a shape similar to the assembled mirror segments 101, 102, with a matching opening to the opening 118. In some embodiments, a lens is positioned within the opening 118. The lens is configured to provide the cone angle of the conical field of view below the aircraft 10.

Figure 3:
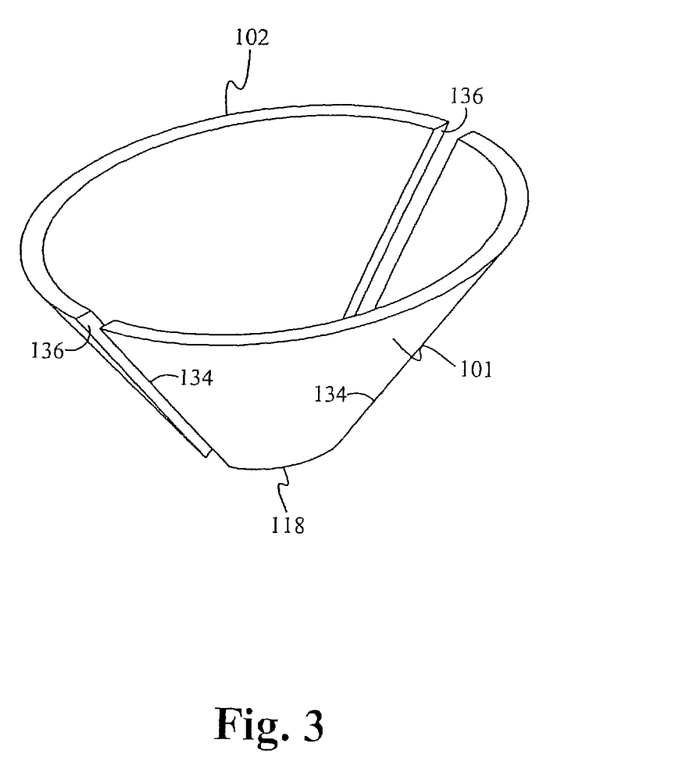
FIG. 3 illustrates a perspective view of the mirror segments 101, 102.
Figure 4:
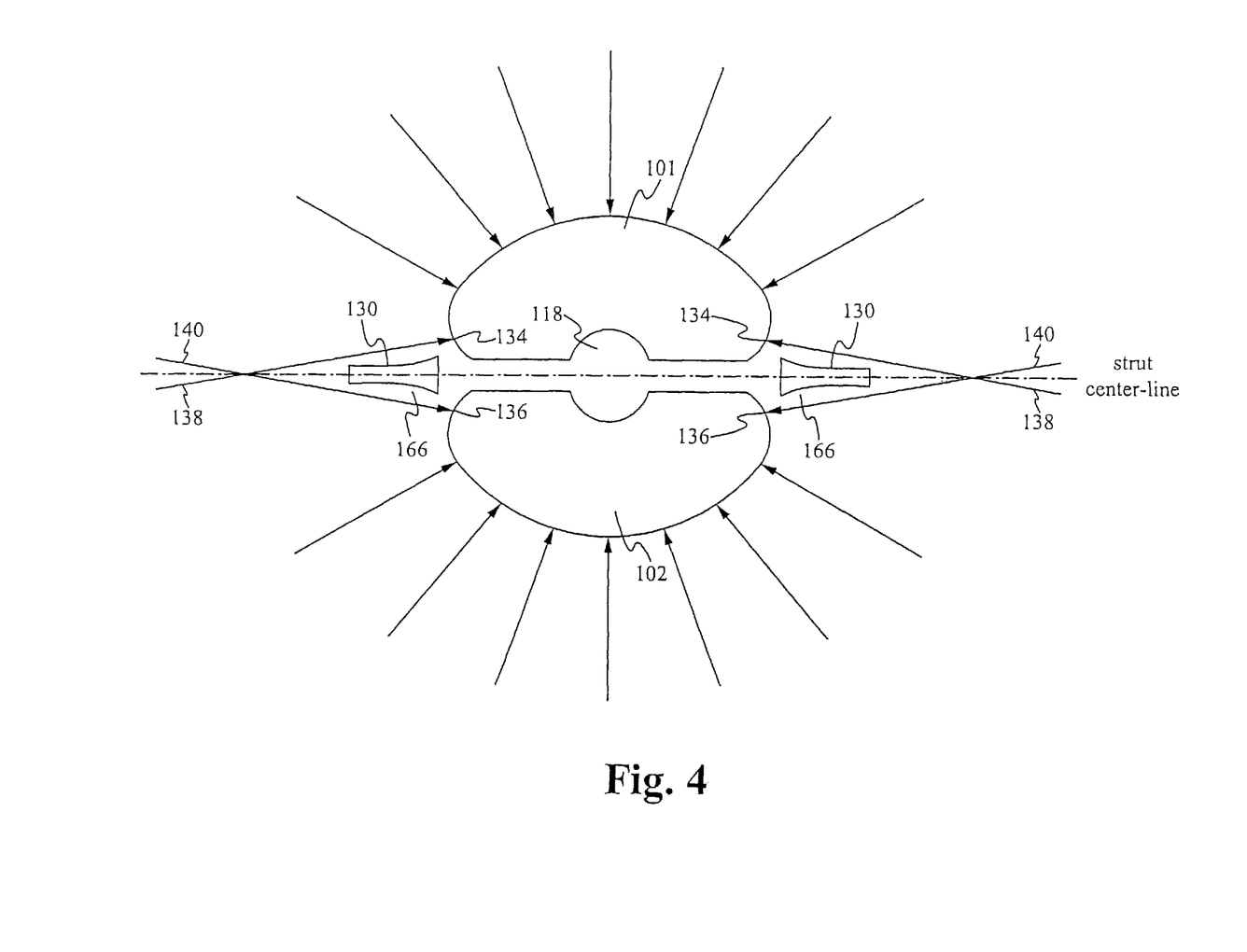
FIG. 4 illustrates a bottom-up view of the mirror segments 101, 102.

FIG. 3 illustrates a perspective view of the mirror segments 101, 102. FIG. 4 illustrates a bottom-up view of the mirror segments 101, 102. The arrows impinging the mirror segments 101, 102 in FIG. 4 represent light rays. Although not shown in FIGS. 3 and 4, the struts 130 (FIG. 2) are positioned in the gap between the mirror segments 101, 102, at the end of the mirror segments opposite the opening 118. The position of the struts 130 is represented by a strut center-line in FIG. 4. The mirror end 134 of the mirror segment 101 and the mirror end 136 of the mirror segment 102 are curved such that each mirror segment 101, 102 reflects light from a panoramic field of view greater than 180°. This configuration enables light to be collected from around the struts 130, thereby giving an uninterrupted 360° panoramic field of view. In other words, the shape of the mirror segments 101, 102 near the intersection of the struts 130 are curved in such a way as to enable light rays 138 and 140 to enter the detector array 110 (FIG. 2) that would normally be obstructed by the struts 130. Although the shape of the mirror segments 101, 102 provides a 360° panoramic field of view, there is a dead space 166 proximate the detection system 100 within which light is not detected. However, the dead space 166 covers a relatively small volume of airspace, extending only a few feet from the detection system 100.

In general, the configuration and shape of the mirror segments 101, 102 provide at least the following important features. First, light detection from the airspace is directed around the struts, so that there is no occlusion of light due to the struts. Second, the mirror segments can include facets, as described in detail below. Third, the mirror segments can linearly or non-linearly provide sterpixels of light into the detector array. Linear distribution provides uniform pixel detection in elevation and azimuth. Non-linear distribution provides non-uniform pixel detection, for example a greater number of sterpixels are gathered from at or near the horizontal plane, and fewer sterpixels are gathered away from the horizontal plane. Such mirror segment configuration redistribute the detectors in azimuth and/or elevation.

The struts 130 are positioned within the dead space 166, and as such, the struts 130 do not obstruct the toroidal field of view monitored by the detection system 100. The mirror segments 101, 102 and the struts 130 are oriented such that the strut center-line is aligned with the forward direction of the aircraft. The struts 130 are also narrowly configured through the direction of airflow.

In some embodiments, the detection system 100 is configured for thermal detection. In this case, the bezel 105 and the lens 108 are configured to pass long wave infrared (LWIR) light and the detector array 110 is configured to detect LWIR light. In some configurations, the outer surfaces of the mirror segments 101, 102 are coated with an efficient reflective coating, with high reflectance and low optical distortion, for LWIR light, and the mirror segments 101, 102 are made from an alloy aluminum substrate. In general, the detection system 100 can be configured to detect any desired light wavelength, and the mirror segments, lenses, mirrors, and detector array are configured to direct and detect the desired light wavelength.

Figure 5:
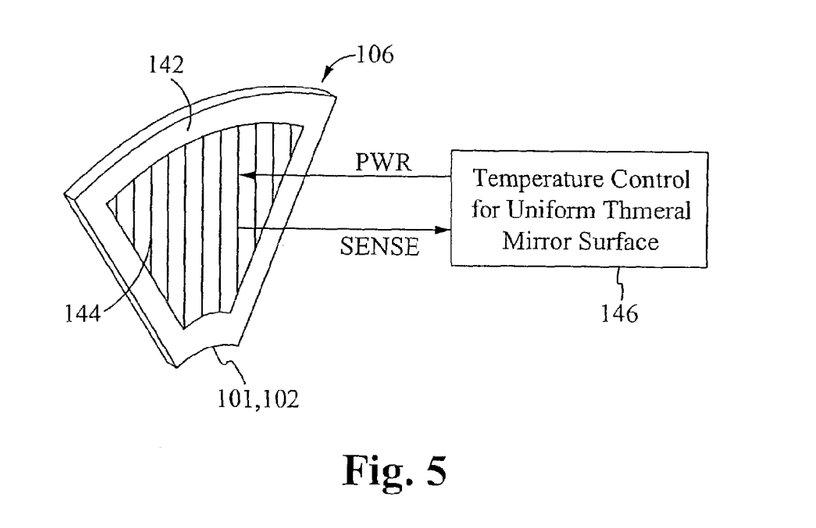
FIG. 5 illustrates one of the mirror segments including a thermal electric cooler (TEC).

In some embodiments, the inside, or concave, surface of the mirror segments 101, 102 is evenly temperature chilled as a means to improve the LWIR image quality. FIG. 5 illustrates a portion of one of the mirror segments including a thermal electric cooler (TEC). The substrate of each mirror segment 101, 102 is cooled by a TEC 144 and controlled by a temperature monitoring and actuation circuit 146. The circuit 146 can be included in the system processing assembly 114 (FIG. 2), or the circuit 146 can be a stand-alone circuit. In an exemplary application, the mirror segments 101, 102 are temperature controlled to limit the noise generated by temperature fluctuations in the mirror segments.

In general, the fairing 120 functions to divert airflow past the mirror segments 102, 102 and also functions as a structural element to couple the struts 130 to the mirror segment assembly. In some embodiments, the fairing 120 (FIG. 2) extends into the interior of the mirror segment assembly to provide structural support to the mirror segments 101, 102. The fairing 120 can be shaped similarly to an upside down cup with a hole at its bottom. The fairing 120 can be a framework or a solid form. In other embodiments, the fairing 120 only extends partially into the mirror segment assembly, or is positioned substantially at the widest diameter of the mirror segment assembly with little if any extension into the interior of the mirror segment assembly. Where the fairing 120 is configured as a cup-like structure, the shape of this "cup" is similar to the shape of the assembled mirror segments 101, 102. A wide end of the cup is coupled to the struts 130, and the hole in the cup is aligned to the opening 118 in the mirror segments 101, 102. In this configuration, the fairing 120 (FIG. 2) does not block the light from the conical-shaped airspace below the aircraft 10 from passing through the opening 118 into the bezel 105 (FIG. 2). In other embodiments, the fairing 120 blocks some or all of the light from the conical-shaped airspace from passing through the opening 118. In this case, additional optical elements are included to direct light from a substantially similar conical-shaped airspace outside the diameter of the mirror segments 101, 102 and through the bezel 105.

Figure 6:
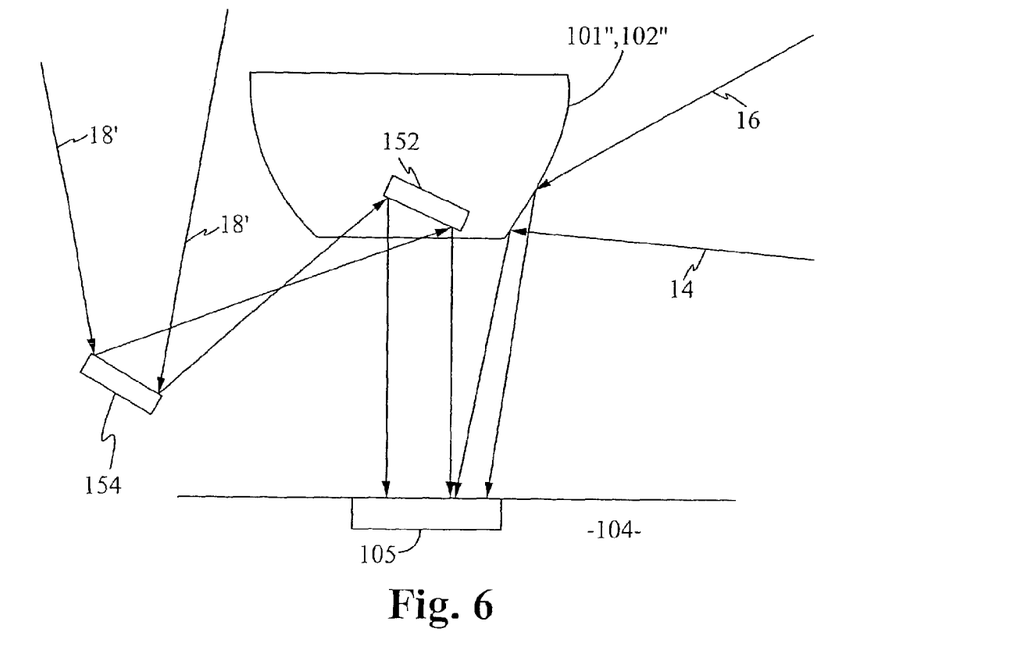
FIG. 6 illustrates a cut-out side view of an alternatively configured mirror segment assembly.

FIG. 6 illustrates a cut-out side view of an alternatively configured mirror segment assembly. Mirrors 152 and 154 direct light from a conical-shaped airspace outside the diameter of the mirror segments 101', 102' and through the bezel 105. In some embodiments, the mirror 152 is positioned outside the apex of the mirror segments 101' 102'. In this case, there is no need for the opening 118. In other embodiments, as shown in FIG. 6, the mirror 152 is positioned in the interior of the assembled mirror segments 101', 102'. In this case, the opening 118' is configured to allow light to be reflected from the mirror 154, through the opening 118', to the mirror 152, and back out the opening 118' to the bezel 105.

The detection system 100 is configured as either a single-mode detection system or a multiple-mode detection system. As a single-mode detection system, the detection system detects a defined range of light wavelengths, such as long wave infrared light, using an optical detection system that includes the mirror segment assembly and detector array. As a multiple-mode detection system, there is sensitivity to a spectrum of electromagnetic energy. Differently defined ranges such as LWIR or visible light and RF energy collection are known applied science. The LWIR light is detected using the mirror segment assembly and detector array, and the RF energy is detected using an RF antenna assembly. In some embodiments, the detection system is configured for passive detection, also referred to as "listen only", where the detection system detects spurious EM energy, such as LWIR light or RF light, coming at the aircraft. In other embodiments, the detection system is configured for passive and active detection, also referred to as "broadcast". In this case, the detection system also includes an RF transmitter that actively transmits RF signals. The detection system configured in this manner passively detects spurious EM energy as well as actively detects reflected RF signals.

In some embodiments, individual RF antenna elements within the RF antenna assembly can be individually tuned to adjust their respective phases, thereby forming a single conceptual receiver configured to detect RF signals from a computer controlled direction.

Figure 7:
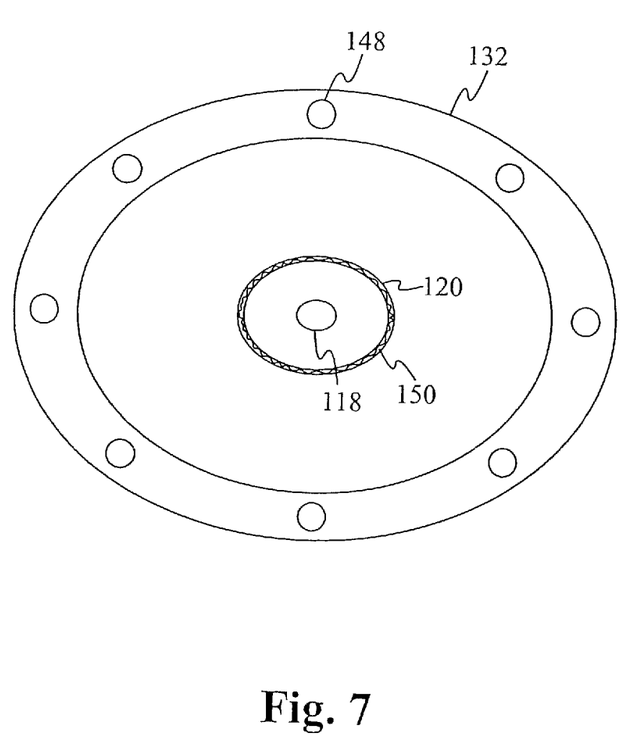
FIG. 7 illustrates a bottom up view of the mirror segments 101, 102 configured for passive and active RF signal detection.

FIG. 7 illustrates a bottom up view of the mirror segments 101, 102 configured for passive and active RF signal detection. An array of RF antenna elements 148 and an RF transmitter 150 are coupled to the fairing 120 to form a phased RF transceiver. It is understood that the fairing 120 can be configured for only passive RF signal detection. In this case, the RF transmitter 150 is removed.

Although the multiple-mode operation is described as detecting RF signals, it is understood that other wavelength signals can be detected, such as micro-wave signals. In this case, the RF antenna elements are replaced by microwave antenna elements, and the RF transmitter is replaced by a microwave transmitter.

Figure 8:
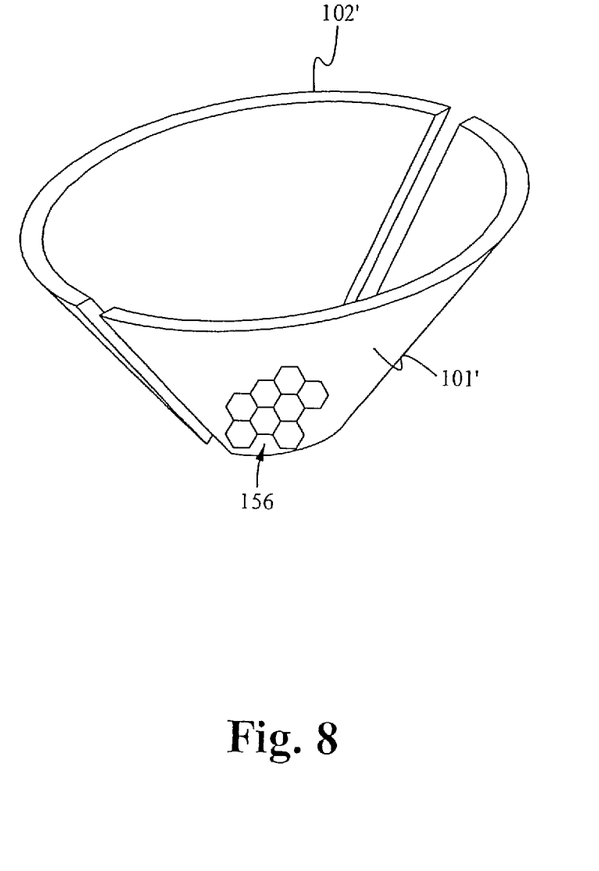
FIG. 8 illustrates an exemplary configuration of a portion of the mirror segments 101, 102 including a plurality of facets.

The detector array 110 includes a plurality of detectors, each detector detects a pixel of light across a defined solid angle. Any pixel orientated system is a quantized system. The more pixels, the more continuous the data appears. In one method of distribution, the mirror segments 101, 102 are configured to provide a substantially uniform coverage of the toroidal-shaped airspace and the conical-shaped airspace monitored by the detection system 100. In another method, a detection signal-to-noise ratio is improved by grouping many detectors through a small sterpixel volume, where a sterpixel is the solid angle of light coming from the volume that impinges a specific detector. FIG. 8 illustrates an exemplary configuration of a portion of the mirror segments 101', 102' including a plurality of facets. Facets 156 are fabricated on the mirror segments 101', 102', where each facet is a flat or curved face on the outer surface of the mirror segment and forms each small sterpixel volume. Each facet enables a group of detectors to detect light from substantially the same airspace, thereby quantizing the signal detection over many detectors. This configuration improves the signal-to-noise ratio per group of sterpixels, but reduces the overall volume of airspace imaged.

Facets can be formed by micro-machining. Using facets on the mirror segments in this manner, the aircraft 10 is surrounded by 'porky pine spikes' of detection zones, each spike corresponding to a facet. The signals from the group of photo detectors associated with each facet 156 are analyzed by the system processor to determine if a detection threshold has been met, thereby indicating a 'near-object' is present. Although FIG. 8 shows facets fabricated on only a portion of the mirror segments 101', 102', it is understood that facets can be fabricated on any or all surfaces of the mirror segments 101', 102' and can have different individual shapes and sizes.

Figure 9:
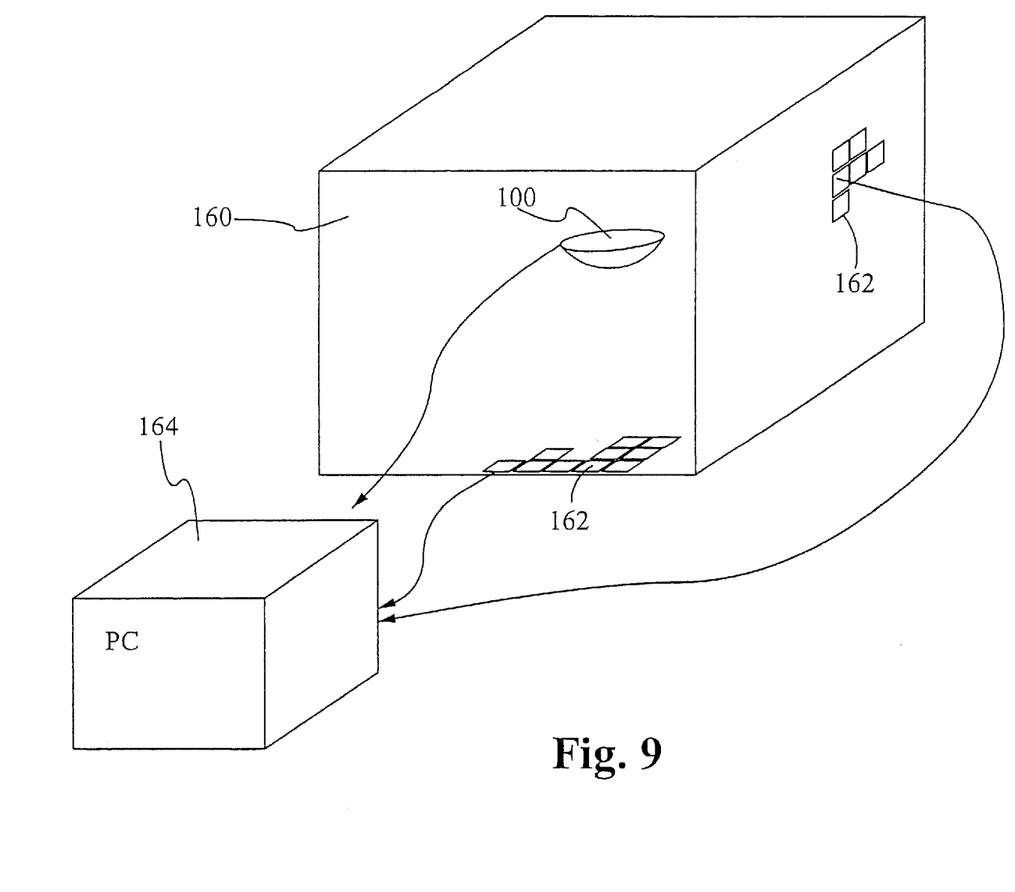
FIG. 9 illustrates an exemplary system for calibrating the detection system 100.

In order for the detection system 100 to accurately determine a position of any detected object, the detection system 100 is calibrated and a translation table is generated. FIG. 9 illustrates an exemplary system for calibrating the detection system 100. The detection system 100 is placed in the center of a calibration chamber 160. The detection system 100 is coupled to a computing device 164 to send sensor data collected by each of the detectors in the detector array 110 (FIG. 2). Emitters 162 are positioned on the inner surface of the calibration chamber 160. In some embodiments, emitters cover the entire inner surface of the calibration chamber. In other embodiments, emitters are placed only on those portions of the inner surface that correspond to the defined toroidal field of view and the conical field of view to be monitored by the detection system 100. FIG. 9 shows only a portion of the emitters 162. Each of the emitters 162 is coupled to the computing device 164. The computing device 164 initiates an emitter activation sequence by which each emitter 162 is independently activated, one at a time. The response of the detector array 110 is measured upon each emitter activation. The size of the calibration chamber 160 and the size of each of the emitters 162 are configured such that each emitter 162 is a single sterpixel corresponding to each detector in the detector array 110. The mirror segments 101, 102 are formed in such a way that the optical system allows each detector to collect light within a unique sterpixel, where each sterpixel corresponds to a specific segment of the monitored airspace. These segments can be distributed linearly or non-linearly through the airspace. As such, there should be a one-to-one relationship between each detector and each sterpixel in space, as represented by a specific emitter 162. The calibration process determines if there are any non-monotomic responses of the detector array, meaning that a single detector should not detect light emitted from two or more different emitters 162, which represents two or more different sterpixels in space.

Figure 10:
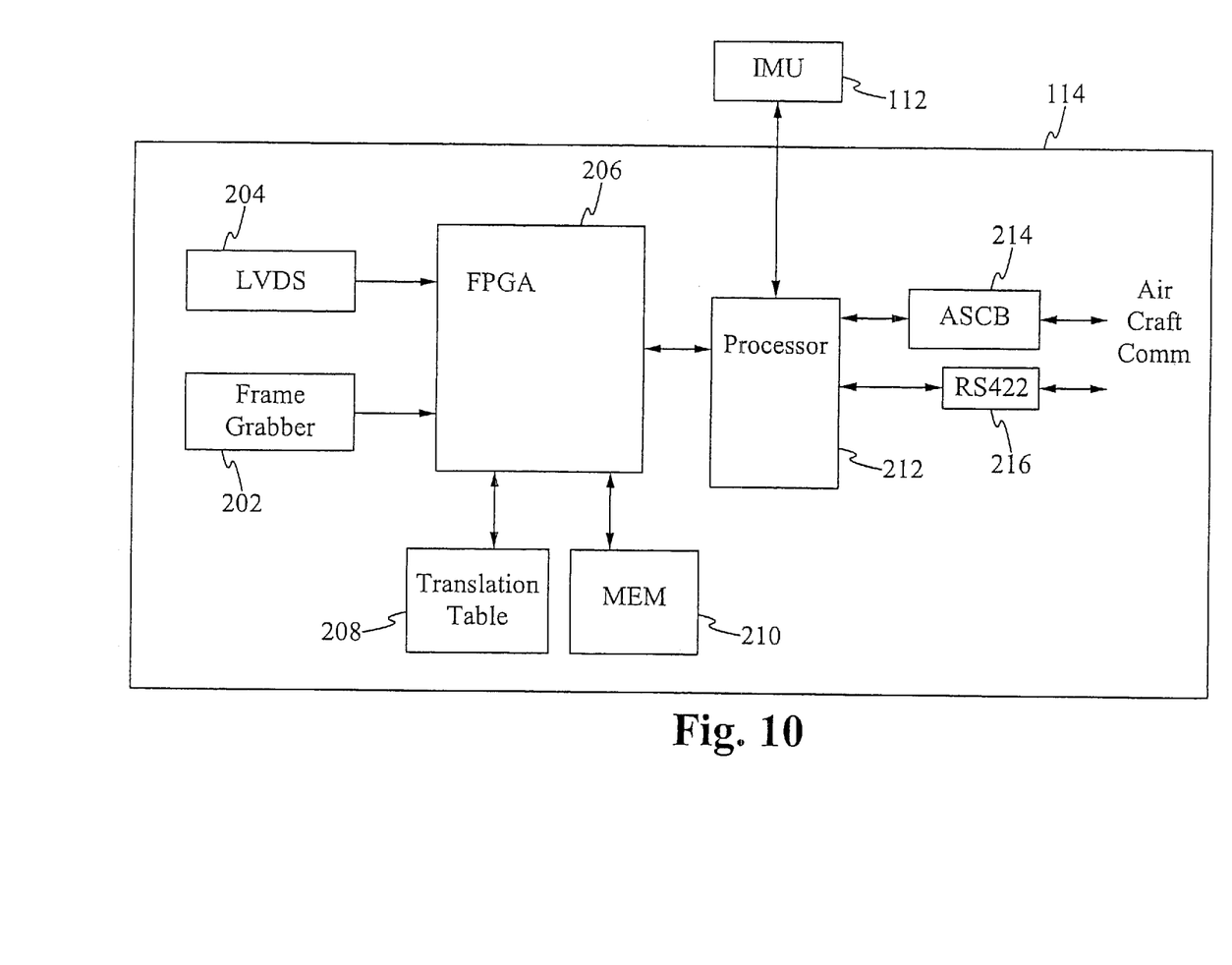
FIG. 10 illustrates an exemplary schematic block diagram of the system processing assembly 114.

Further, for the detection system 100 to determine an accurate position of a detected object, the detection system 100 calculates positional data according to a predefined coordinate system. This coordinate system defines an optimal theoretical relationship between each detector and a corresponding sterpixel location in space that the detector measures. According to this theoretical mapping, each detector should detect light emitted from a single specific emitter position, for example detector A detects light emitted by emitter A. The calibration method experimentally determines an actual relationship between detectors and sterpixels. If it is determined that detector A instead detects light emitted from emitter B, a translation is calculated that compensates for the difference between the position of emitter B and the position of the emitter A. In this manner, a translation table is generated for each of the detectors in the detector array 110 so that when light is detected, an actual position of any detected object is determined. The translation table is stored in system memory 208 (FIG. 10). Such a calibration corrects for fabrication errors in the mirror segments and/or the detectors, as well as for installation alignment errors of the mirror segments when initially installed in the system.

FIG. 10 illustrates an exemplary schematic block diagram of the system processing assembly 114. The system processing assembly 114 computes background, moving objects, inertially compensates the objects, calculates kinetic trajectories of interference risk, and communicates with outside systems. The system processing assembly 114 controls and interfaces with the detector array 110 and the IMU 112, integrates the collected data, and determines various characteristics of the airspace around the aircraft 10. The IMU 112 generates spatial reference data that is used by the system processing assembly 114 to establish a world coordinate of objects detected by the detector array 110 or radar 148. In some embodiments, the IMU 112 is part of the aircraft electronics and is external to the system processing assembly 114. In other embodiments, an IMU is included in the system processing board of the detection system.

Pixel data collected by the detector array 110 is either digitized by a common frame-grabber 202 or if the pixel data is already digitized by the detector array 110, the digital pixel data is read by a low voltage, differential signal receiver (LVDS) 204. The digital pixel data is provided to a field programmable array (FPGA) 206. In some embodiments, the frame grabber 202 and the LVDS 204 are part of circuitry inside the FPGA 206. The FPGA 206 performs realtime spatial sterpixel re-mapping to overcome all optical system errors. Detector data is input at a variable rate, typically at a 30 Hz frame rate.

As pixel data enters the FPGA 206, it is directed to a buffer in external memory 210. The location in the buffer is determined by the re-mapping process using the translation table 208. The resultant buffer of sterpixels in memory 210 is addressed as a uniform toroid about the aircraft 10. In the case where facets 156 (FIG. 8) are used, the buffer of sterpixels in memory 210 is addressed as a progression of spikes within the toroid-shaped airspace about the aircraft 10.

The system processor 212 reads the aircraft referenced sterpixels from memory 210 and takes data from the IMU 112 and computes stabilized spatial awareness according to Earth coordinates. In this manner, the processor re-maps the sterpixel data from an aircraft reference to an Earth reference. The processor 212 determines object presence and trajectory from multiple, time-separated, detector data and the aircraft's kinetic motions to achieve spatial stable tracking of foreign objects. From the analysis of the foreign object, the level of threat is determined for annunciation to the aircraft avionics and pilot. The system processor 212 interfaces to the aircraft avionics through the Avionics Standard Communications Bus 214 protocol. An additional communication path is provided for redundancy and technical support by a RS422 serial interface 216.

Figure 11:
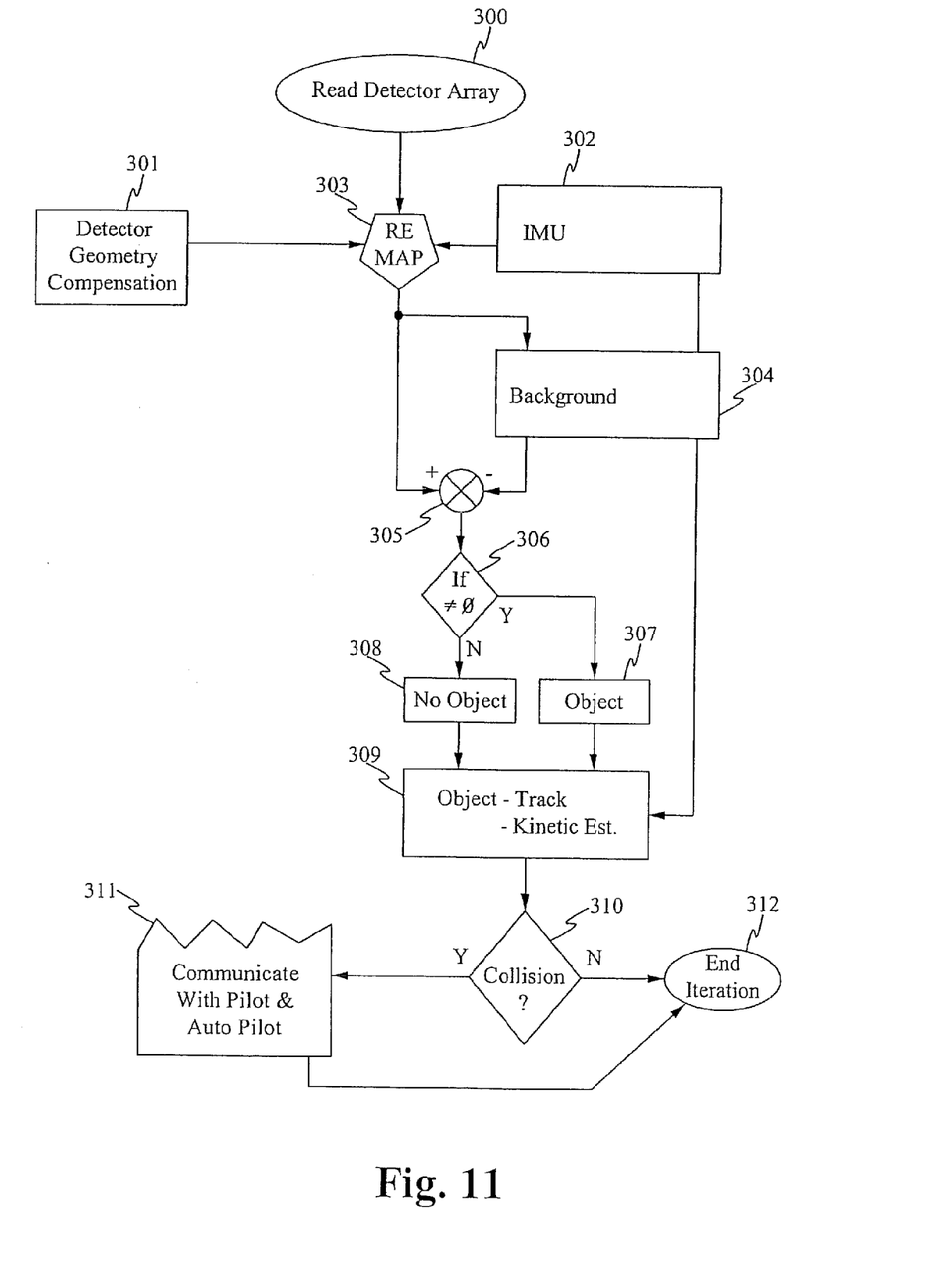
FIG. 11 illustrates an exemplary process for determining a potential collision with the aircraft.

FIG. 11 illustrates an exemplary collision avoidance process. At the step 300, pixel data collected by the detector array 112 is input to the FPGA 206 at some variable frame rate. The pixel data from all detectors represents a complete instantaneous field of view, referred to as a frame. In this exemplary application, the frame rate is thirty frames a second (30 Hz). As previously described, the field of view includes the toroidal field of view around the aircraft and the conical field of view below the aircraft. Each detector in the detector array is mapped to a specific volumetric geometry, sterpixel, during the factory calibration procedure, thereby resulting in the aforementioned translation table. At the step 301, the translation table is retrieved from memory 208. At the step 302, current inertial data of the aircraft 10 is retrieved from the IMU 112. At the step 303, the new frame of detector measurements received at the step 300 is compensated for spatial location by the translation table received at the step 301, and the new frame is compensated according to the current inertial data received at the step 302, thereby forming an Earth-referenced frame. The Earth-referenced frame is stored in an image buffer organized in the system memory as a uniform and geo-located detection zone surrounding the aircraft. The detection zone includes the toroidal-shaped airspace and the conical-shaped airspace.

At the step 304, the system processor 212 computes and maintains a normal, or background, value for each detector and groups of detectors. If an object is present in the monitored airspace, the object may be detected by one or more detectors, depending on the size of the object and on the distance between the object and the aircraft. For example, an object positioned near an outer range of the detection airspace may be detected only be a single detector. As that same object moves closer to the aircraft, multiple adjacent detectors may detect the object. The background is computed as a running, weighted average of past Earth-referenced frame measurement values.

At the step 305, for each new Earth-referenced frame generated at the step 303, the new Earth-reference frame is compared to the background data computed at the step 304. Comparison is made on a detector by detector basis, or on a group of detectors by group of detectors basis. In this manner, pixel data collected from a first detector, or first group of detectors, is compared to background data corresponding to the same first detector, or first group of detectors. At the step 306, it is determined if the comparison performed at the step 305 results in a difference that exceeds a predetermined threshold value. In the case where the thermal detector detects LWIR, there is a thermal difference between an object and the background. If it is determined at the step 306 that the difference exceeds the predetermined threshold, then at the step 307 it is determined that either a new object is present in the corresponding airspace or a previously detected object has moved. A location of the detected object is recorded along with an internal identification. If it is determined at the step 306 that the difference does not exceed the predetermined threshold, then at the step 308 it is determined that either no new object is present in the corresponding airspace or a previously detected object is still present in the corresponding airspace.

At the step 309, existing objects have their location, direction, velocity, and acceleration computed at each iteration of this process. These computations use the data from the IMU to determine the object's relative interaction with the aircraft. At the step 310, it is determined if the object is going to collide with the aircraft. This determination is made using the object dynamics calculated at the step 309 and the current aircraft dynamics, collectively referred to as collision metrics. If it is determined at the step 310 that a collision condition exists, then at a step 311, this condition is communicated to the pilot, auto-pilot, or the aircraft's self defense system. If it is determined at the step 310 that a collision condition does not exist, then at a step 312 the current iteration of the collision avoidance process ends and the next iteration of the collision avoidance process begins at the step 300.

The detection system is described above as including a reflective optical component, such as the mirror segments 101, 102, to reflect light to a lens and detector array. In an alternative embodiment, the reflective optical component is replaced with a fisheye lens. Light is collected by the fisheye lens over a panoramic field of view ranging through an angel 360° in azimuth and an angle above the horizon 2, such as the first angle 4. This eliminates the need for a support system, such as the fairing 120 and the struts 130. In some embodiments, RF antenna elements are positioned around the fisheye lens. In still other embodiments, RF transmitters in addition to the RF antenna elements are positioned around the fisheye lens.

Although the object detection and collision avoidance system is described in terms of an aircraft while in flight, the system can also be used for detection objects and avoiding collisions while the aircraft is on the tarmac, either moving or parked. The object detection and collision avoidance system can also be used in applications other than aircraft related, including but not limited to, surveillance and alarm systems for detecting intruders.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. An apparatus comprising:
   a. a detector array configured to detect long wave infrared light;
   b. an optical assembly configured to direct light received from a toroidal-shaped airspace surrounding an aircraft to the detector array, wherein the optical assembly comprises a staring-based optical system;
   c. a processor configured to receive pixel data corresponding to the detected long wave infrared light from the toroidal-shaped airspace and to determine collision metrics corresponding to non-cooperative objects within the toroidal-shaped airspace according to the detected long wave infrared light.

2. The apparatus of claim 1 further comprising a radar antenna to receive radio frequency signals, and the processor is configured to determine collision metrics according to the detected radio frequency signals.

3. The apparatus of claim 2 further comprising a radar transmitter configured to output a radio frequency signal from the apparatus.

4. The apparatus of claim 1 wherein the optical assembly is further configured to detect long wave infrared light from a conical-shaped airspace below the aircraft.

5. The apparatus of claim 1 wherein the optical assembly comprises a plurality of mirror segments coupled to an exterior of the aircraft.

6. The apparatus of claim 5 wherein the plurality of mirror segments are configured to reflect light to the detector array through an angel 360 degrees in azimuth.

7. The apparatus of claim 5 wherein each mirror segment is separated from each other mirror segment.

8. The apparatus of claim 5 further comprising a plurality of struts configured to couple the plurality of mirror segments to the exterior of the aircraft.

9. The apparatus of claim 8 wherein a shape of each of the plurality of mirror segments is configured to reflect light received from the toroidal-shaped airspace to the detector array and to avoid occlusion of light received from the toroidal-shaped airspace by the plurality of struts.

10. The apparatus of claim 8 wherein the plurality of mirror segments comprises two mirror segments, and each mirror segment is curved to reflect light to the detector array through an angle greater than 180 degrees in azimuth.

11. The apparatus of claim 10 wherein the plurality of struts are positioned between the two mirror segments.

12. The apparatus of claim 8 further comprising a fairing coupled to the plurality of struts and to the plurality of mirror segments.

13. The apparatus of claim 12 wherein the fairing is coupled to a non-exterior surface of each of the plurality of mirror segments.

14. The apparatus of claim 5 wherein the plurality of mirror segments include an opening at an apex of the plurality of mirror segments, wherein long wave infrared light from a conical-shaped airspace below the aircraft is detected by the detector array through the opening.

15. The apparatus of claim 14 further comprising a lens positioned in the opening at the apex.

16. The apparatus of claim 14 wherein the processor is further configured to determine collision metrics corresponding to non-cooperative objects within the conical-shaped airspace according to the detected long wave infrared light.

17. The apparatus of claim 5 wherein one or more of the plurality of mirror segments includes one or more facets.

18. The apparatus of claim 5 further comprising a thermal electric cooler coupled to an interior surface of each mirror segment.

19. The apparatus of claim 1 further comprising a system memory configured to store a translation table, wherein the translation table includes position compensation data for each detector in the detector array to compensate for fabrication or alignment error.

20. The apparatus of claim 19 further comprising an inertial measurement unit to measure an inertial movement of the aircraft.

21. The apparatus of claim 20 wherein the processor is configured to determine the collision metrics using data corresponding to the detected long wave infrared light, the translation table, and the inertial movement of the aircraft.

22. The apparatus of claim 1 wherein the apparatus is configured to passively detect long wave infrared light.

23. The apparatus of claim 1 wherein the non-cooperative object is an object that does not purposely transmit its position.

* * * * *